Jan. 17, 1961  H. GOLDE  2,968,514
SLIDING ROOF HAVING A RIGID SLIDING COVER
Filed Feb. 10, 1959

United States Patent Office 2,968,514
Patented Jan. 17, 1961

2,968,514

SLIDING ROOF HAVING A RIGID SLIDING COVER

Hans Golde, Hanauerlandstr. 338, Frankfurt am Main, Germany

Filed Feb. 10, 1959, Ser. No. 792,395

Claims priority, application Germany Feb. 15, 1958

6 Claims. (Cl. 296—137)

The present invention relates to motor vehicles of the type having a sliding rigid cover which can be displaced by means of an axially movable worm cable or the like, a worm gear meshing with the cable being provided for driving said cable, said worm gear being caused to rotate by an electric motor.

In order to guide the motion of the cover, guide rails are mounted laterally on the fixed roof of the vehicle in a manner known per se, and the sliding cover comprises on both sides adjacent its rear edge guide shoes which slide along the associated rails. Said guide shoes are firmly connected to the displaceable worm cable, and according to my copending application Serial No. 687,760, they are so connected to the cover by way of a hinge-like mechanism having two articulated bolts that actuation of the mechanism in the front end position of the cover causes a lifting or lowering of the rear edge of the cover. A dead-center position of the hinge must be avoided when the cover is lowered.

It is necessary to lift the cover before locking it in order to align said cover with the roof of the motor vehicle, while the lowering of the sliding cover prior to its being opened places the same in the correct position for sliding under the fixed roof of the vehicle.

The present invention relates to an improvement of the above mentioned arrangement so that it is no longer necessary to limit accurately the motion of the hinge to avoid the dead-center position. In addition, the hinge-like mechanism according to the present invention is so developed that it can in a simple manner be adapted to different types of vehicles having varying differences in height between the bottom position and the top position of the sliding cover.

The invention further permits of compensating finishing tolerances which, even when sliding roofs are built into motor vehicles of the same type, may have the effect that the sliding cover is not in exact alignment with the fixed roof of the vehicle. The invention finally allows for adjustment if the friction lining of the guide shoe, which may for example be made of felt, has worn thin after prolonged use and if the cover is therefore too low with respect to the fixed roof.

According to the invention, the distance between the two articulated bolts or the like of the hinge-like mechanism is adjustable, so that a change of said distance permits changing the height of the sliding cover in its closing position, and an accurate limitation of the hinge motion can be dispensed with, since same is started independently of a possible dead-center position of the hinge by the fact that a lug arranged on the sliding cover rides up a ramp arranged on the frame of the roof.

An embodiment of the invention with additional details is described below by way of the accompanying drawings, in which.

Figure 4:
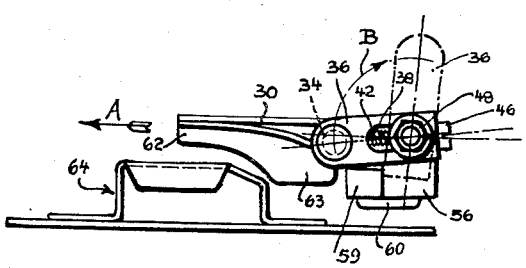
Fig. 4 shows a detail of Figs. 2 and 3 in side view, the sliding cover being partially open, i.e. lowered.

The direction of travel in Fig. 4 is indicated by the arrow.

Figure 1:
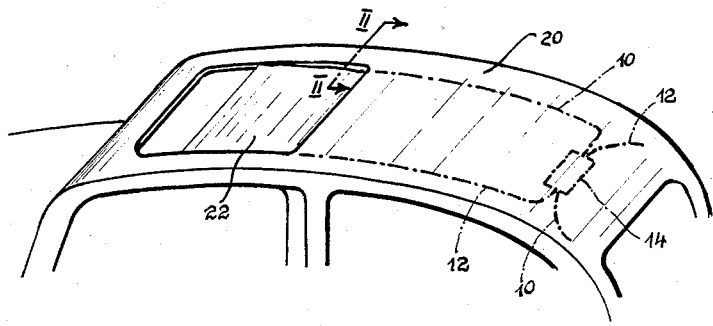
Fig. 1 is a diagrammatic perspective view of the top portion of a motor vehicle with a half-open sliding cover.

Fig. 1 shows a rigid sliding cover 22 arranged in the fixed roof 20 of a motor vehicle and displaceably guided along guide rails fixedly mounted under the roof 20. The cover 22 is driven by way of an assembly 14 which contains an electric motor and a worm gear rotated by the motor. Said worm gear is in driving engagement with two worm cables 10 and 12, which are displaced axially within appropriate guide ducts when the worm gear rotates. The front ends of the cables 10, 12 are connected to the sliding cover 22. The members described above merely serve to explain the arrangement and are not the subject matter of the present invention.

After the cover 22 has been driven into its frontmost position, the rear edge of the cover must be raised to be adapted to the fixed roof 20 and, in a corresponding manner, when the sliding roof is opened, the rear edge of the cover 22 must first be lowered before it is possible to push the cover rearwardly under the fixed roof 20. The raising and lowering requires special means which, according to my copending application Serial No. 687,760, comprise a hinge-like mechanism with two articulated pins. This mechanism is inserted on each side of the sliding cover between the cover and a guide shoe, by means of which the cover 22 slides along the lateral guide rails on the fixed roof 20. The present invention relates to a special development of said hinge-like mechanism which is described in detail below, by way of Figs. 2 to 4.

Figure 2:
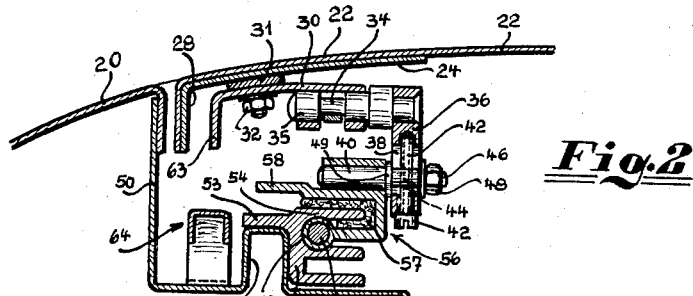
Fig. 2 is an enlarged section taken along the line II—II of Fig. 1, with the cover completely closed.

Fig. 2 shows a perpendicular cross section through the right side of the vehicle roof and through the mechanism which connects the cover 22 to its right rear guide shoe. The front guide of the cover may be constructed in any known manner whatsoever.

A reinforcing plate 24 with a rear flange 26 and a lateral flange 28 is rigidly fixed, by spot welding or the like, to the edge of the cover 22 bent downwardly at an angle. A bearing 30 for the hinge-like mechanism with screws 32 and with an intermediate plate 31 is rigidly fixed to the plate 24. In the bearing 30, a hinge pin 34 is rotatably positioned, but is secured against axial displacement by a head 35. The pin 34 is rigidly connected to a bar or leg 36 which comprises a guide slot 38. A second hinge pin 40 is positioned in the slot 38, the distance of the pin 40 from the pin 34 being adjustable by means of an adjusting screw 42, which meshes with the inner thread of a transverse bore 44 of the pin 40 and which is positioned rotatably (without a mating thread) in the member 36. The outer end 46 of the pin 40 is provided with a thread, so that the pin can be fixed in its adjusted position along the slot 38 by tightening a nut 48 against a collar 49.

A profiled frame 50 with a U-shaped channel 51 is welded on the fixed roof 20. Rigidly fastened to the U-shaped channel 51 is an E-shaped guide rail 52, which has a bearing flange 53 and an upper leg 54. A substantially U-shaped guide shoe 56 with an insert 57 of felt is slidably positioned on the leg 54. The guide shoe 56 carries a bearing 58, in which the hinge pin 40 is rotatably positioned, as well as a solid block 59 which limits the pivoting motions of the hinge member 36 in both directions.

The lower flange of the guide shoe 56 forms a clamp 60 firmly embracing the worm cable 10. The sliding cover 22 is, therefore, firmly connected to the cable 10 by way of the plate 24, the screws 32, the bearing 30, the hinge mechanism 34, 36, 40, the bearing 58, the guide shoe 56 and the clamp 60.

The bearing 30 has a downwardly extending flap 62 which widens toward the back and forms a lug 63. A ramp 64 is so associated with said bearing 30 that, when the sliding cover 22 advances, the lug 63 rides up the ramp 64 shortly before the cover reaches its frontmost position. The ramp 64 is rigidly arranged on the roof frame 50.

Figure 3:
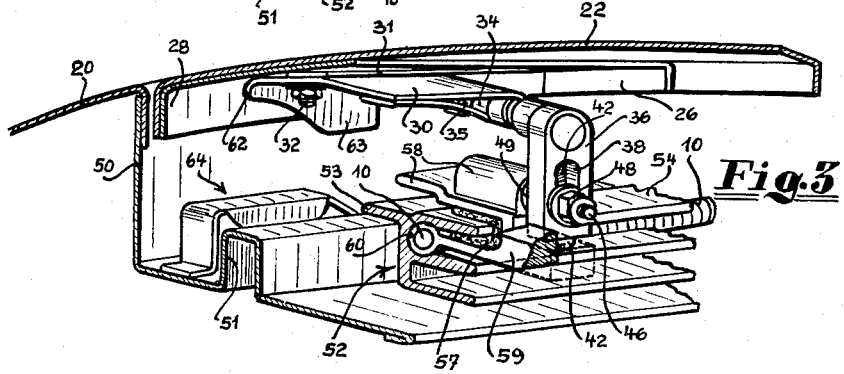
Fig. 3 is a perspective view of the hinge-like mechanism according to the invention shown in vertical section in Fig. 2.

When the roof of the vehicle is closed, the sliding cover 22 must be in alignment with the fixed roof 20, as is shown in Figs. 2 and 3. The development of the hinge-like mechanism according to the invention makes it possible to correct mistakes of the height of the sliding cover in a simple manner by way of the adjusting screw 42, since turning of the screw will change the distance between the two pins 34 and 40 and hence the distance of the cover 22 from the fixed guide rail 52.

When the roof is to be opened, the cables 10 and 12 first only pull the guide shoes 56 with the bearing 58 for the lower hinge pin 40 toward the back (counter to the direction of the arrow A). This causes the hinge arm 36 to slant forwardly, under the weight of the cover 22, against the block 59 (Fig. 4). When the hinge is in this position, the axis of the pin 34, according to the above-noted copending application, would have to be higher than that of the pin 40, in order to avoid a dead-center position of the hinge. In the present, improved device, however, the functioning of the hinge for lifting the cover 22 is independent of the relative position of the axes of the pins, i.e., independent of the exact position of a limiting stop 59 or the like, because the opening of the hinge is initiated during the forward motion (in the direction of the arrow) of the guide shoes 56 by lug 63 and the ramp 64, shortly before the frontmost position of the cover 22 has been reached. This has the effect of avoiding a possible dead-center position, in which the axis of the pin 34 is located at the same level as or at a lower level than the axis of the pin 40. The further pivoting motion of the hinge arm 36 in the direction of the arrow B (Fig. 4) then takes place by the advancing of the pin 40 positioned on the guide shoe 56, after the cover 22 has reached its frontmost position, so that the pin 34 is deflected upwardly, thereby lifting the cover into the closing position.

The above description of an embodiment shows that the invention, which is not limited to the structural details of the example, permits compensating tolerances with simple means, the incorporation of which substantially facilitates and simplifies the installation of sliding roofs with the aid of mass-produced prefabricated members.

What is claimed is:

1. In a vehicle having a roof defining an opening and a rigid sliding cover in the opening; apparatus for controlling the position of the cover in the opening comprising a guide connected to the roof, a shoe slidable along said guide, first pivot means connected to the cover, second pivot means connected to the shoe, and adjustable connecting means connecting said first and said second pivot means; said adjustable connecting means comprising a bar having an end rigidly connected with said first pivot means, the rod being provided with a longitudinal slot, the second pivot means being provided with a threaded bore parallel to the longitudinal slot, a bolt rotatable but restricted against axial movement in said bar and parallel to the longitudinal slot, said bolt including an outer threaded portion engaging the bore of said second pivot means so that a rotation of the bolt effects a shifting of said second pivot means along said slot.

2. Apparatus according to claim 1, wherein said bar which is rigidly connected at its one end with said first pivot means is provided, at its other end, with a guide bore terminating in said longitudinal slot and extending in the direction of said slot, the bolt extending through the guide bore and including a head bearing against said other end of the bar.

3. Apparatus according to claim 1, wherein said second pivot means includes, on one side of said bar, a fixed abutment and, on the other side of the bar, a threaded portion, a nut engaging the latter said portion and movable toward the fixed abutment so that by means of said nut the bar can be clamped against the abutment whereby the position of the second pivot means adjusted by said bolt is additionally secured.

4. Apparatus as claimed in claim 1 comprising a block on said shoe for limiting pivotal movement of said bar.

5. Apparatus as claimed in claim 4 comprising a worm cable engaging said shoe for moving the same along said guide, said block being positioned to limit pivotal movement of said bar with said first and second pivot means in a position in which the distance between the pivot axis of said first pivot means and said guide is smaller than the distance between said second pivot means and said guide.

6. Apparatus as claimed in claim 5 comprising a ramp on said roof, a lug fixed to said cover for engaging said ramp and adapted to pivot said cover to a position in which the axis of said first pivot means is a greater distance from said guide than is the axis of said second pivot means.

References Cited in the file of this patent

UNITED STATES PATENTS

| 2,496,785 | Finneburgh | Feb. 7, 1950 |
| 2,560,496 | Vigmostad | July 10, 1951 |
| 2,661,234 | Bishop | Dec. 1, 1953 |
| 2,697,633 | Slason | Dec. 21, 1954 |

FOREIGN PATENTS

| 477,731 | Great Britain | Jan. 5, 1958 |